(12) United States Patent
Liu

(10) Patent No.: US 6,921,048 B2
(45) Date of Patent: Jul. 26, 2005

(54) METHOD AND APPARATUS FOR MINIMIZING SOLAR ARRAY SUN TRACKING DISTURBANCE BY NORTH AND SOUTH SOLAR ARRAY WING CANCELLATION

(75) Inventor: Ketao Liu, Cerritos, CA (US)

(73) Assignee: The Boeing Company, Chicago, IL (US)

( * ) Notice: Subject to any disclaimer, the term of this patent is extended or adjusted under 35 U.S.C. 154(b) by 146 days.

(21) Appl. No.: 10/348,663

(22) Filed: Jan. 21, 2003

(65) Prior Publication Data

US 2004/0140399 A1 Jul. 22, 2004

(51) Int. Cl.[7] ................................................ B64G 1/38
(52) U.S. Cl. .......................... 244/164; 244/168; 244/173
(58) Field of Search ............................ 244/158 R, 164, 244/165, 169, 168, 171, 170, 173

(56) References Cited

U.S. PATENT DOCUMENTS

| | | | |
|---|---|---|---|
| 4,843,294 A | | 6/1989 | Bhat et al. |
| 5,520,359 A | | 5/1996 | Merhav et al. |
| 5,610,848 A | * | 3/1997 | Fowell .................. 364/724.07 |
| 6,003,817 A | * | 12/1999 | Basuthakur et al. ........ 244/173 |
| 6,311,929 B1 | * | 11/2001 | Kazimi et al. .............. 244/164 |
| 6,311,931 B1 | * | 11/2001 | Smay ......................... 244/164 |

* cited by examiner

Primary Examiner—Galen Barefoot
(74) Attorney, Agent, or Firm—Gates & Cooper LLP

(57) ABSTRACT

A method and system for minimizing the solar array sun tracking disturbance is disclosed. The method separates the North solar array wing stepping and South solar array wing stepping in time, and use the disturbance caused by one solar array wing to cancel the disturbance caused by the other solar array wing. It separates the step times of these two solar arrays by a half cycle of the array frequency excited by the solar wing drive stepping. Because of the symmetry between the North and South solar arrays, their disturbances cancel each other out.

22 Claims, 9 Drawing Sheets

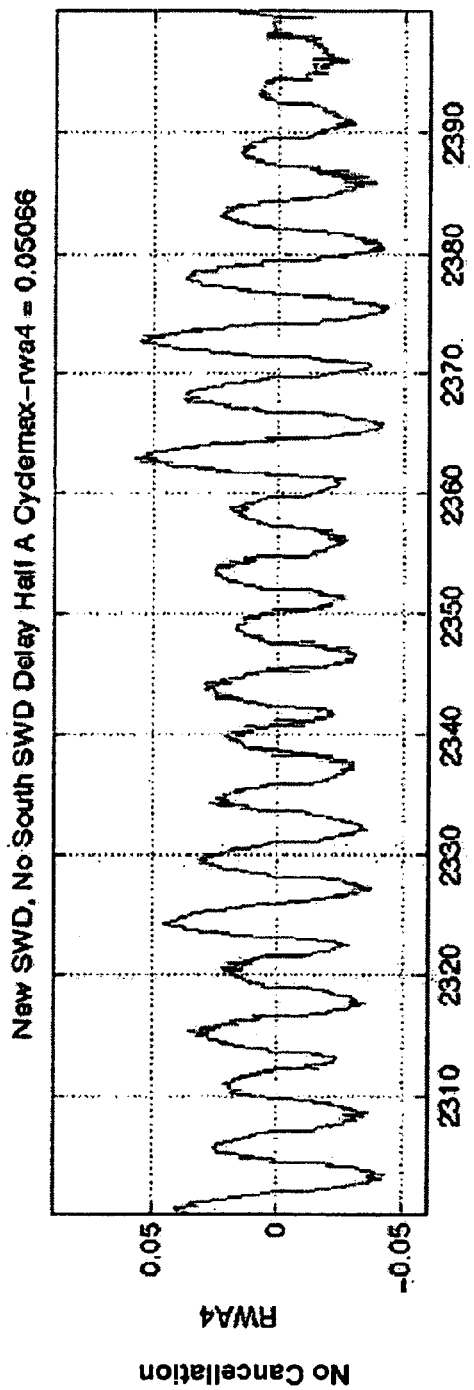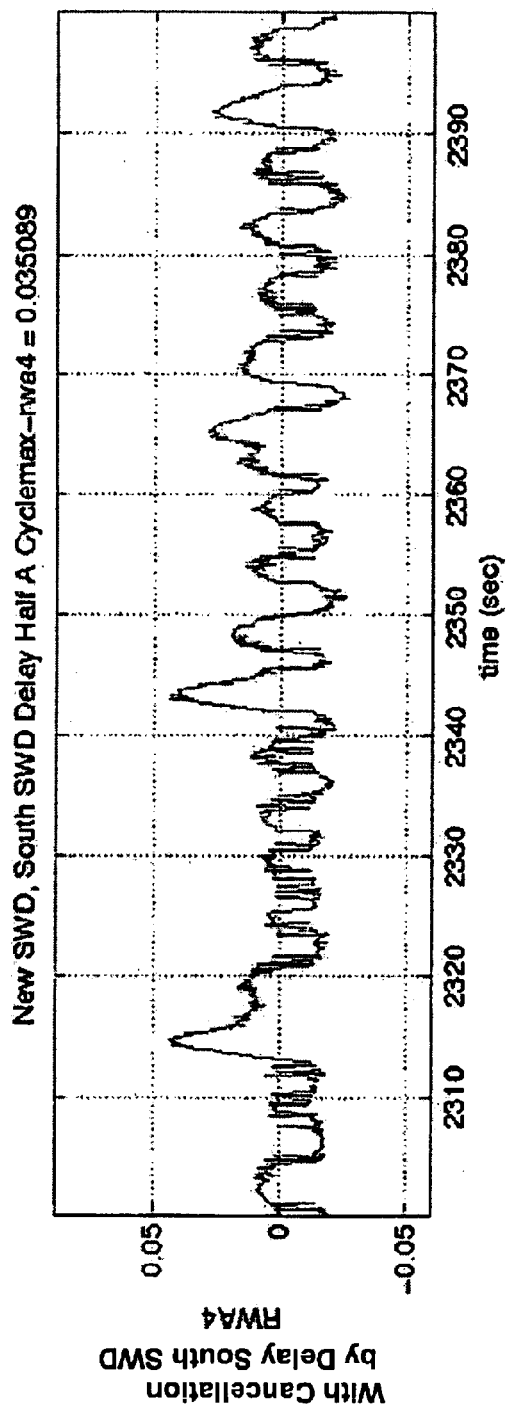
FIG. 7A  No Cancellation
FIG. 7B  With Cancellation by Delay South SWD

METHOD AND APPARATUS FOR MINIMIZING SOLAR ARRAY SUN TRACKING DISTURBANCE BY NORTH AND SOUTH SOLAR ARRAY WING CANCELLATION

BACKGROUND OF THE INVENTION

1. Field of the Invention

The present invention relates generally to systems and methods for controlling spacecraft or satellite, and in particular to a system and method for minimizing solar array sun tracking disturbances.

2. Description of the Related Art

Most three-axis stabilized spacecraft or satellites use two solar arrays to generate power for operation of electrical systems aboard the spacecraft. The solar array must be maintained in a position normal to the sun to absorb the optimum amount of radiation. For optimal performance, the planar surface of the solar array is typically maintained substantially normal to a vector from the spacecraft to the sun. This is accomplished by servo-controlled stepping mechanism, such as a stepping motor and an appropriate gear assembly, which rotates the solar array along its longitudinal axis to track the sun while the spacecraft orbits about the Earth. The rate that the solar array must be rotated is a function of the satellite orbital period, but is typically about 0.004 degrees per second.

The solar wing driver (SWD) typically includes a stepper motor coupled to the solar arrays via gear-driven transmission. Stepper motors are desirable because they are relatively simple to control, reliable, lightweight and well adapted to continuous use.

However, the use of a stepper motor with highly flexible solar arrays may potentially excite some structural modes of the solar array and generate significant oscillation disturbances in the spacecraft itself. These disturbances can degrade the spacecraft pointing, cause excessive activity of the spacecraft control actuators, and make autonomous spacecraft momentum dumping difficult. The induced oscillation is particularly critical in spacecraft where absolute platform stability is desirable. Vibrations can cause deterioration of any inertia-sensitive operations of a spacecraft.

This disturbance problem can be ameliorated by a number of techniques. One technique is to employ high bandwidth control loops to mitigate the impact of this disturbance to the spacecraft pointing. However, this technique has significant limitations. For many spacecraft, the structural modes that are excited by the SWD stepping is outside of the spacecraft control bandwidth. Consequently, these high-bandwidth control loops have only very limited effects on the disturbance. Further extension of the bandwidth of the control loops to include these structural modes will very often result in control loop stability problems. Furthermore, high bandwidth control also unnecessarily increases actuator operation, which can increase wear and result in excess energy consumption. Another technique for minimizing the solar array sun tracking disturbance is disclosed in U.S. Pat. No. 4,843,294, entitled "Solar Array Stepping to Minimize Array Excitation," issued Jun. 27, 1989 to Bhat et al., which is hereby incorporated by reference herein. In this reference, mechanical oscillations of a mechanism containing a stepper motor, such as a solar array powered spacecraft, are reduced and minimized by the execution of step movements in pairs of steps (a two-step dead beat method). The period between steps is equal to one-half of the period of torsional oscillation of the mechanism. While this method can reduce structural disturbances, it is not effective when the mechanism has significant backlash and stiction. This is because the backlash and stiction can significantly interrupt the two-step pattern of this method and thus render it not very effective.

There is therefore a need for a robust system and method for minimizing disturbances in stepper-motor driven solar arrays and related components. The present invention satisfies that need.

SUMMARY OF THE INVENTION

The present invention is described by a method and apparatus for reducing disturbances resulting from stepping a first appendage (such as a North solar wing) and a second appendage (such as a South solar wing) disposed substantially synmetrically about a spacecraft, wherein the first appendage response to each a step is at least partially characterizable by a first natural frequency, and the second appendage response to each a step is at least partially characterizable by a first natural frequency. The method comprises the steps of applying a first step to the first appendage at a first time, and applying a second step to the second appendage at a second time, wherein the second time is selected to substantially cancel first appendage oscillations resulting from applying the fist step to the first appendage. In one embodiment, the second time is selected as approximately equal to one half of a period of the first natural frequency.

SWD stepping disturbances are most significant when the solar array structural frequency and SWD stepping harmonics are close together in frequency. The present invention method temporally separates the steps applied to the North solar array from those applied and South solar array, effectively using the disturbance caused by one solar array to cancel the disturbance caused by the other solar array in the previous step. In one embodiment, the step time of the two solar arrays are temporally separated by a half cycle of the natural frequency of the structural modes excited by the steps applied by the SWD.

The present invention improves spacecraft attitude pointing, reduces undesirable disturbances to the spacecraft, and minimizes the power consumption of the assemblies used to manipulate the North and South solar wings. Further, the stepping can be altered for optimal results even while in-orbit using ground controls.

This invention can be used in combination with the methods disclosed in related application "Method and Apparatus for Stepping Spacecraft Mechanisms at Low Disturbance Rates", which discloses reducing the solar array sun tracking disturbances by alternatively stepping solar arrays at a high rate and a low rate with equal number of steps.

Further novel features and other objects of the present invention will become apparent from the following detailed description, discussion and the appended claims, taken in conjunction with the drawings.

BRIEF DESCRIPTION OF THE DRAWINGS

Referring now to the drawings in which like reference numbers represent corresponding parts throughout:

FIGS. 7A and 7B are diagrams showing the spacecraft reaction wheel control torques before, and after applying the cancellation method in accordance with the present invention.

DETAILED DESCRIPTION OF PREFERRED EMBODIMENTS

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Figure 1:
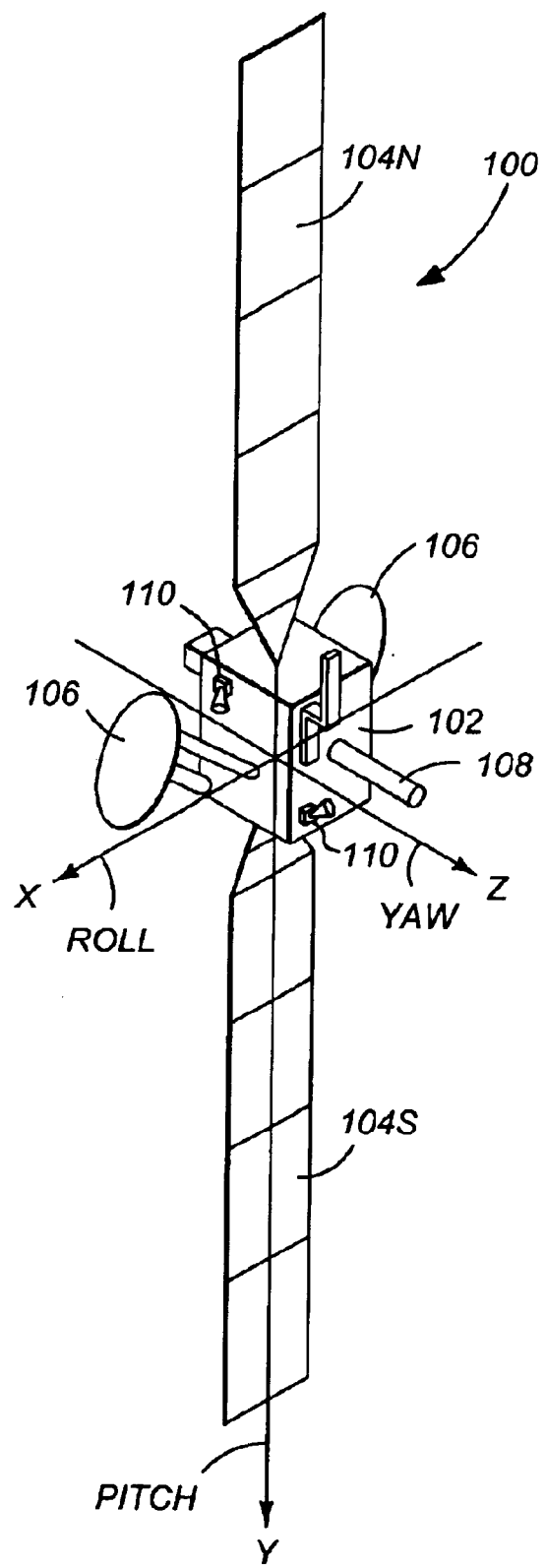
FIG. 1 is a diagram depicting a typical satellite.

FIG. 1 depicts a three-axis stabilized satellite or spacecraft 100. The spacecraft 100 is preferably situated in a stationary orbit about the Earth. The spacecraft 100 has a main body 102, a pair of solar panels 104, a pair of high gain narrow beam antennas 106, and a telemetry and command omni-directional antenna 108 which is aimed at a control ground station. The spacecraft 100 may also include one or more sensors 110 to measure the attitude of the spacecraft 100. These sensors 110 may include sun sensors, earth sensors, and star sensors. Since the solar panels are often referred to by the designations "North" and "South", the solar panels 104 in FIG. 1 are referred to by the numerals 104N and 104S for the "North" and "South" solar panels, respectively.

The three axes of the spacecraft 100 are shown in FIG. 1. The pitch axis P lies along the plane of the solar panels 104N and 104S. The roll axis R and yaw axis Y are perpendicular to the pitch axis P and lie in the directions and planes shown. The antenna 108 points to the Earth along the yaw axis Y.

Figure 2:
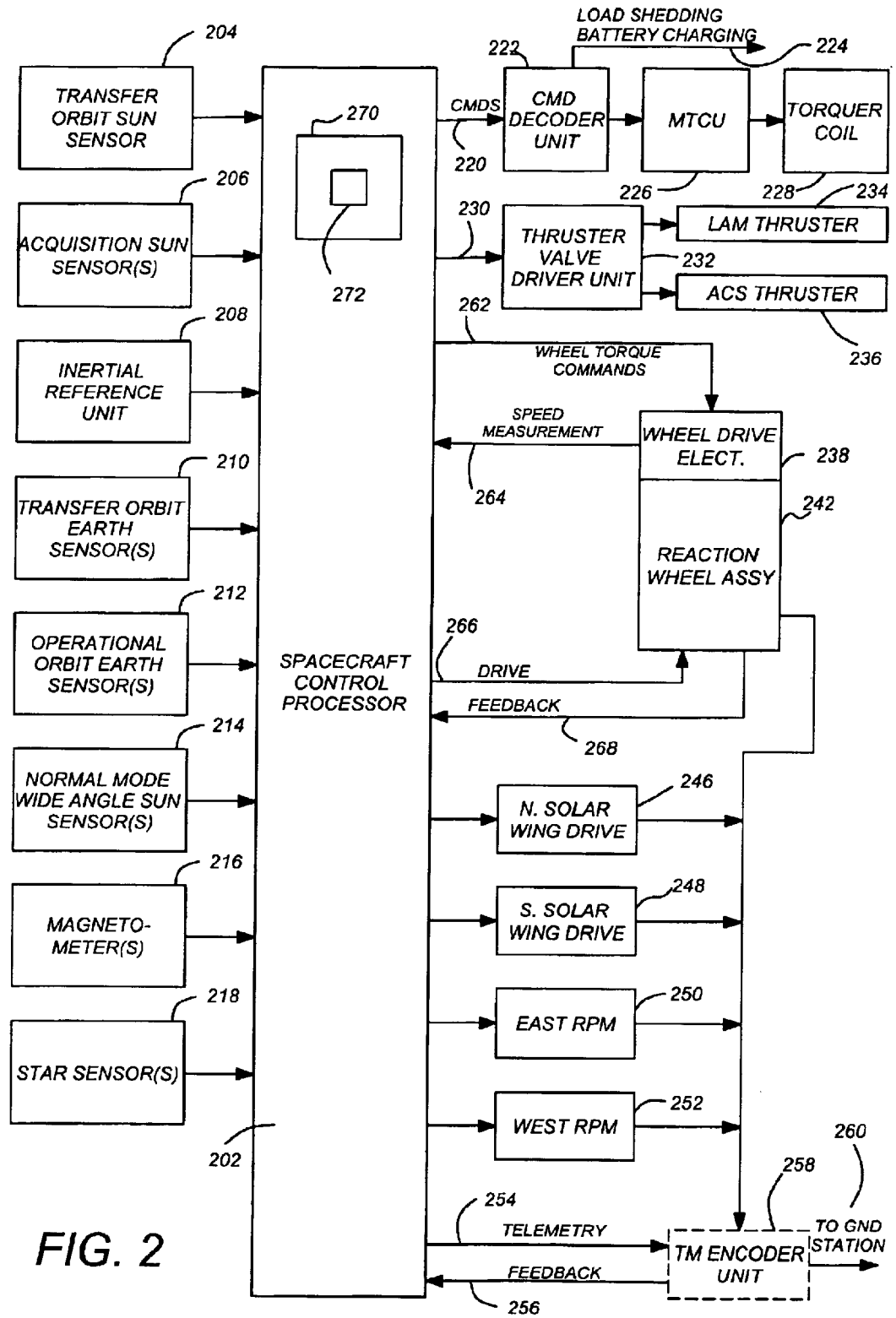
FIG. 2 is a block diagram depicting a satellite control system.

FIG. 2 is a diagram depicting the functional architecture of a representative attitude control system Control of the spacecraft is provided by a computer or spacecraft control processor (SCP) 202. The SCP 202 performs a number of functions which may include post ejection sequencing, transfer orbit processing, acquisition control, station keeping control, normal mode control mechanisms control fault protection, and spacecraft systems support, among others. The post ejection sequencing could include initializing to ascent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The station keeping control could include auto mode sequencing, gyro calibration, station keeping attitude control and transition to normal. The normal mode control could include attitude estimation, attitude and solar array steering, momentum bias control magnetic torqueing, and thruster momentum dumping (H-dumping). The mechanism's mode control could include solar panel control and reflector positioning control. The spacecraft control systems support could include tracking and command processing, battery charge management and pressure transducer processing.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 which are directed to a command decoder unit 222. The command decoder unit 222 operates the load shedding and battery charging systems 224. The command decoder unit 222 also sends signals to the magnetic torque control unit (MTCU) 226 and the torque coil 228.

The SCP 202 also sends control commands 230 to the thruster valve driver unit 232 which in turn controls the liquid apogee motor (LAM) thrusters 234 and the attitude control thrusters 236.

Generally, the spacecraft 100 may use thrusters, momentum/reaction wheels, or a combination thereof to perform spacecraft attitude control.

Wheel torque commands 262 are generated by the SCP 202 and are communicated to the wheel drive speed electronics 238. These effect changes in the wheel speeds for wheels in reaction wheel assembly 242, respectively. The speed of the wheel is also measured and fed back to the SCP 202 by feedback control signal 264.

The SCP 202 communicates with the telemetry encoder unit 258, which receives the signals from various spacecraft components and subsystems indicating current operating conditions, and then relays them to the ground station 260. The telemetry encoder unit 258 also sends ground commands to the SCP 202 that execute ground commanded spacecraft maneuvers and other operations. The telemetry encoder unit 258 can also be used to uplink updated software.

The wheel drive electronics 238 receive signals from the SCP 202 and control the rotational speed of the reaction wheels.

The use of momentum wheels or equivalent internal torquers to control a momentum bias stabilized spacecraft also allows 3 axis control of the spacecraft. In this sense, the canting of a momentum wheel is entirely equivalent to the use of reaction wheels. Other spacecraft employ external torquers, chemical or electric thrusters, magnetic torquers, solar pressure, etc. to control spacecraft attitude.

The SCP 202 may include or have access to memory 270, such as a random access memory A). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM EEPROM, or other memory device. Further, the operating system 272 and the computer program are comprised of instructions which, when read and executed by the SCP 202, causes the spacecraft control processor 202 to perform the steps necessary to implement and/or use the present invention. Computer program and/or operating instructions may also be tangibly embodied in memory 270 and/or data communications devices (e.g., other devices in the spacecraft 100 or on the ground), thereby making a computer program product or article of manufacture according to the present invention. As such, the terms "program storage device," "article of manufacture" and "computer program product" as used herein are intended to encompass a computer program accessible from any computer readable device or media.

Figure 3:
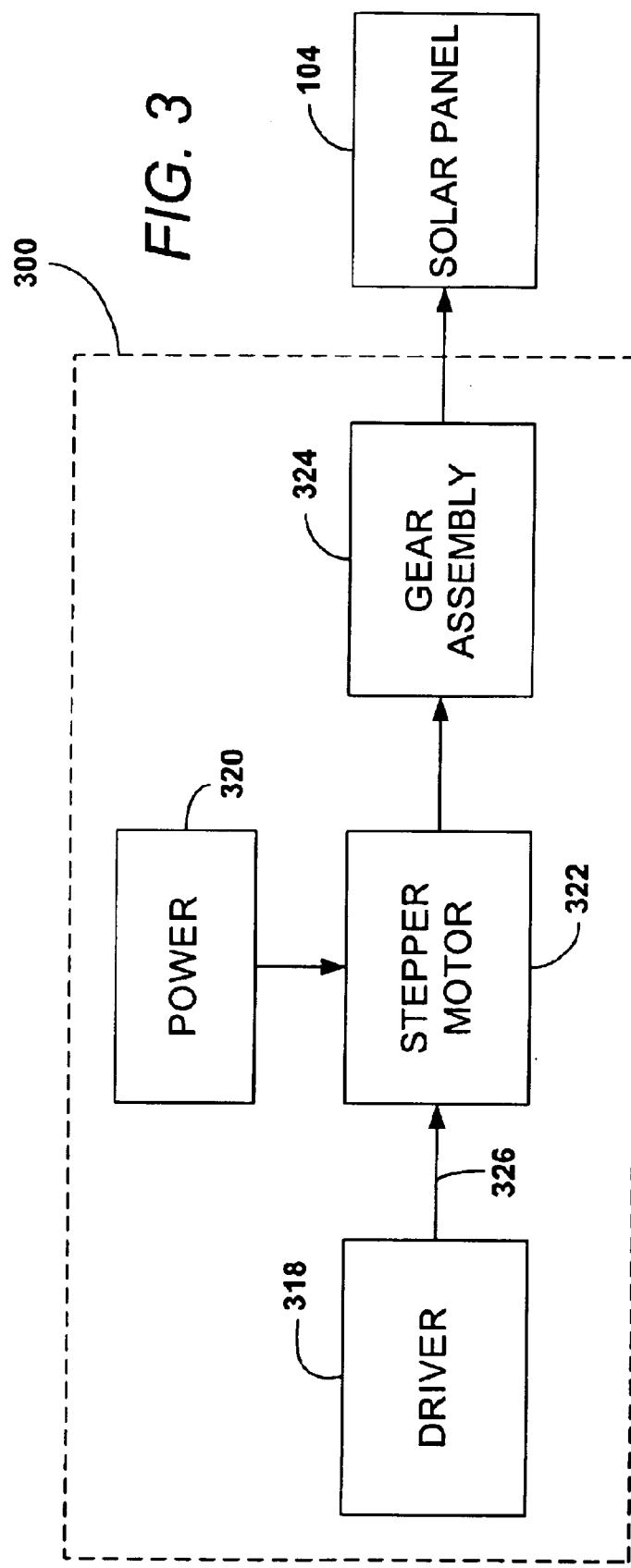
FIG. 3 is a block diagram depicting a SWD usable to manipulate a solar panel to track the Sun.

FIG. 3 is a block diagram of a typical SWD 300 that can be used to implement the North SWD 246 or the South SWD 248 illustrated in FIG. 2. The solar panel 104N or 104S (hereinafter alternately referred to as solar panel(s) 104) is driven by the gear assembly 324 which in turn is coupled to the stepper motor 322. The stepper motor 322 is provided with a suitable power source 320 to supply motive force to the gear assembly 324. The driver 318 provides the input signal by appropriate signal lines 326 to the stepper motor 322. The driver 318 is controlled by the SCP 202 from which necessary timing can be derived for the function applied to the stepper motor 322.

This is accomplished by separating the SWD steps applied to each of the solar arrays 104 by an amount of time so that the step applied to one of the solar arrays substantially cancels the oscillations induced by stepping the other solar array. In one embodiment, a step is applied to a second solar array at a time approximately equal to ½ the period of the structural mode excited by applying a step to the first solar array. This method takes advantage of the symmetry between North and South solar arrays, allowing the step disturbances to cancel each other out. Spacecraft pointing is thereby improved without requiring changes to the sun tracking rate of each individual solar array wing. The timing of the steps applied to each solar array 104 can also be ground commanded, thus allowing uncertainties in the flexible properties of the solar array (alternatively referred to also as solar wings) to be accounted for.

Figure 4:
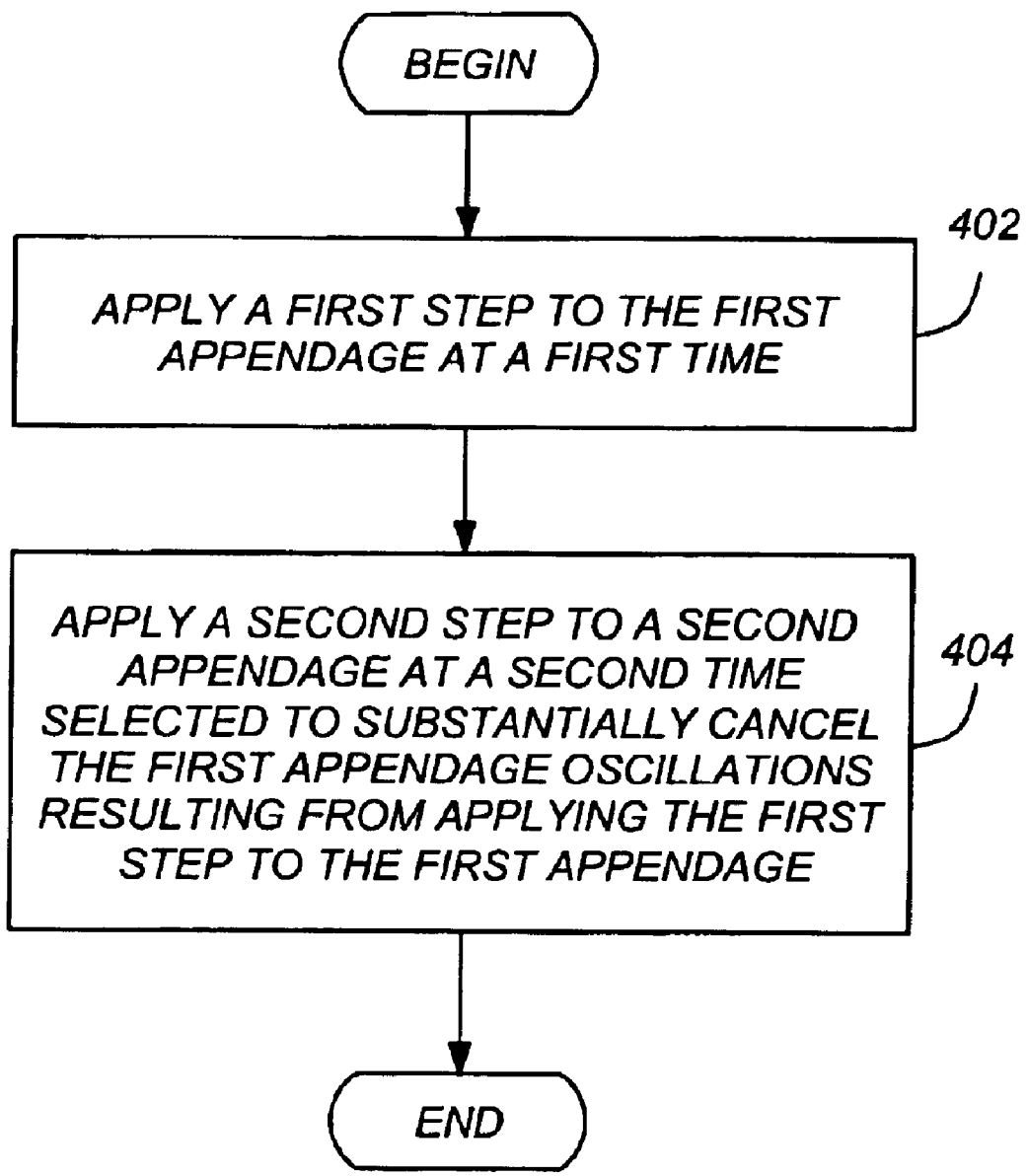
FIG. 4 is a flow chart illustrating exemplary method steps used to practice one embodiment of the present invention.

FIG. 4 is a flow chart illustrating exemplary operations that can be used to practice one embodiment of the present invention. A first step is applied to a first appendage, as shown in block 402. A second step is applied to a second appendage at a second time selected to substantially cancel the first appendage oscillations resulting from the first step that was applied to the first appendage. Because the first appendage and the second appendage are disposed substantially symmetrically about the spacecraft 100, the oscillations induced by stepping either of the appendages are substantially reduced or cancelled by the step applied to the other appendage.

The foregoing method is applicable any satellite having appendages that are substantially symmetrically disposed about the satellite 100. Such appendages can include solar wings 104N, antennas, or sensors. Further, while the method will typically be applied to the manipulation of a pair of solar wings 104, it may be applied to a satellite having appendages of with similar mass properties, but different functions. For example, the first appendage may be a solar wing and the second appendage a sensor boom having similar mass properties. In this case, a step applied to the sensor boom can be controlled to substantially reduce the oscillations resulting from the application of a step to the solar array. Further, in addition to controlling the timing of the step applied to the second appendage, the present invention can be implemented by also controlling the amplitude (as well as the timing) of the second step in order to account for situations wherein the first and second appendages are not completely symmetric.

Figure 5A:
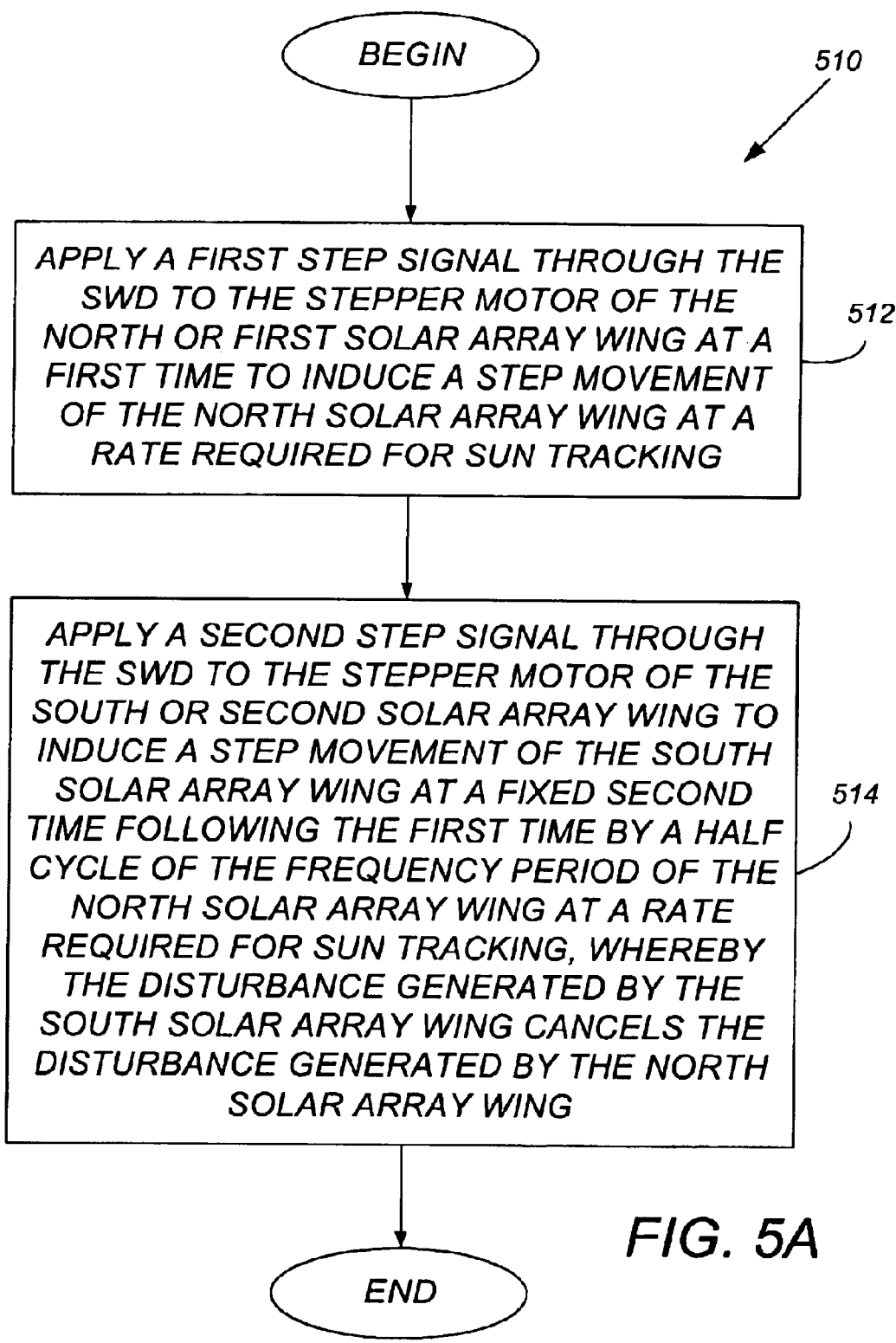
FIG. 5A is a flow chart illustrating exemplary method steps used to practice one embodiment of the present invention.

FIG. 5A is a flow chart illustrating exemplary operations that can be used to practice one embodiment of the present invention. The method 510 steps (rotates) the North and South solar array wings 104 at a rate required for sun tracking. A first step signal is applied through the SWD 300 to the stepper motor of the North solar array wing 104N at a first time to induce a step movement of the North solar wing 104N at a rate required for sun tracking, as shown in block 512. A second step signal is applied though the SWD 300 to the stepper motor of the South solar array wing 104S to induce a step movement of the South solar array wing 104S at a fixed second time following the first time by a half cycle of a frequency period of the North solar array wing 104N at a rate required for sun tracking, whereby the disturbance generated by the South solar array wing 104S cancels the disturbance generated by the North solar array wing 104N, as shown in block 514.

Figure 6A:
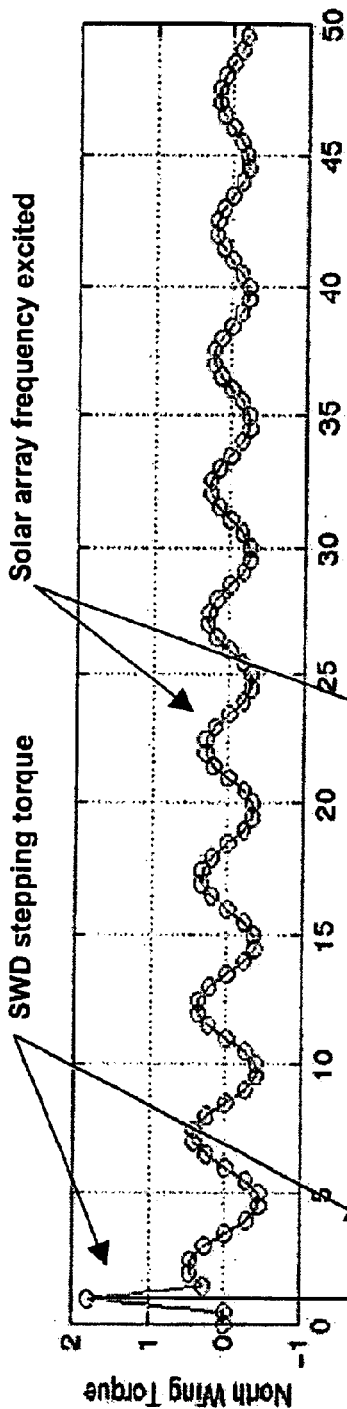
FIG. 6A is a graph showing the North wing disturbance torque induced by the North solar array wing.
Figure 6B:
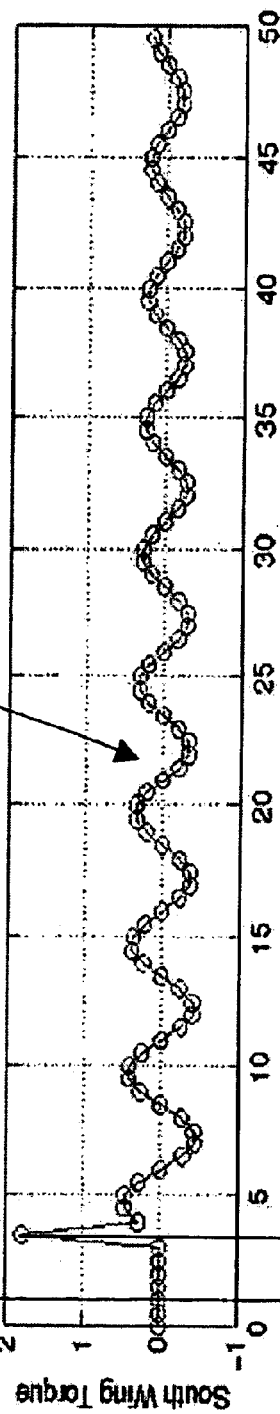
FIG. 6B is a graph showing the South wing disturbance torque induced by the South, solar array wing, where stepping of the South solar array wing is delayed by a half cycle of the solar array frequency being excited.
Figure 6C:
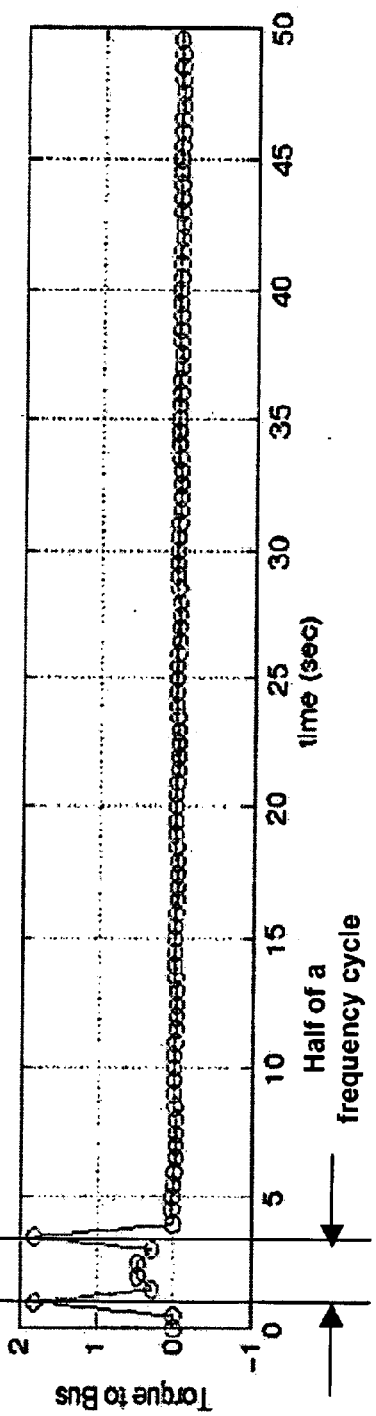
FIG. 6C is graph showing the results of the cancellation method in accordance with the present invention.

The foregoing method separates SWD 300 step times of these two solar array wings by a half cycle of the array frequency excited by SWD 300 stepping. Thus using the method 510, the steps of the North and South solar array wings 104 cancel each other by ensuring their frequency and amplitude are 180 degrees out of phase, which makes causes their sum to go to zero or substantially decrease the magnitude of the net disturbance (as shown in FIGS. 6A, 6B and 6C discussed below). In practice, perfect cancellation is not generally possible since the phases and magnitude of the response of each of the solar wings 104 will vary slightly. The practical definition is that the two signals substantially cancel each other, decreasing the magnitude of the sum of the two signals.

Figure 5B:
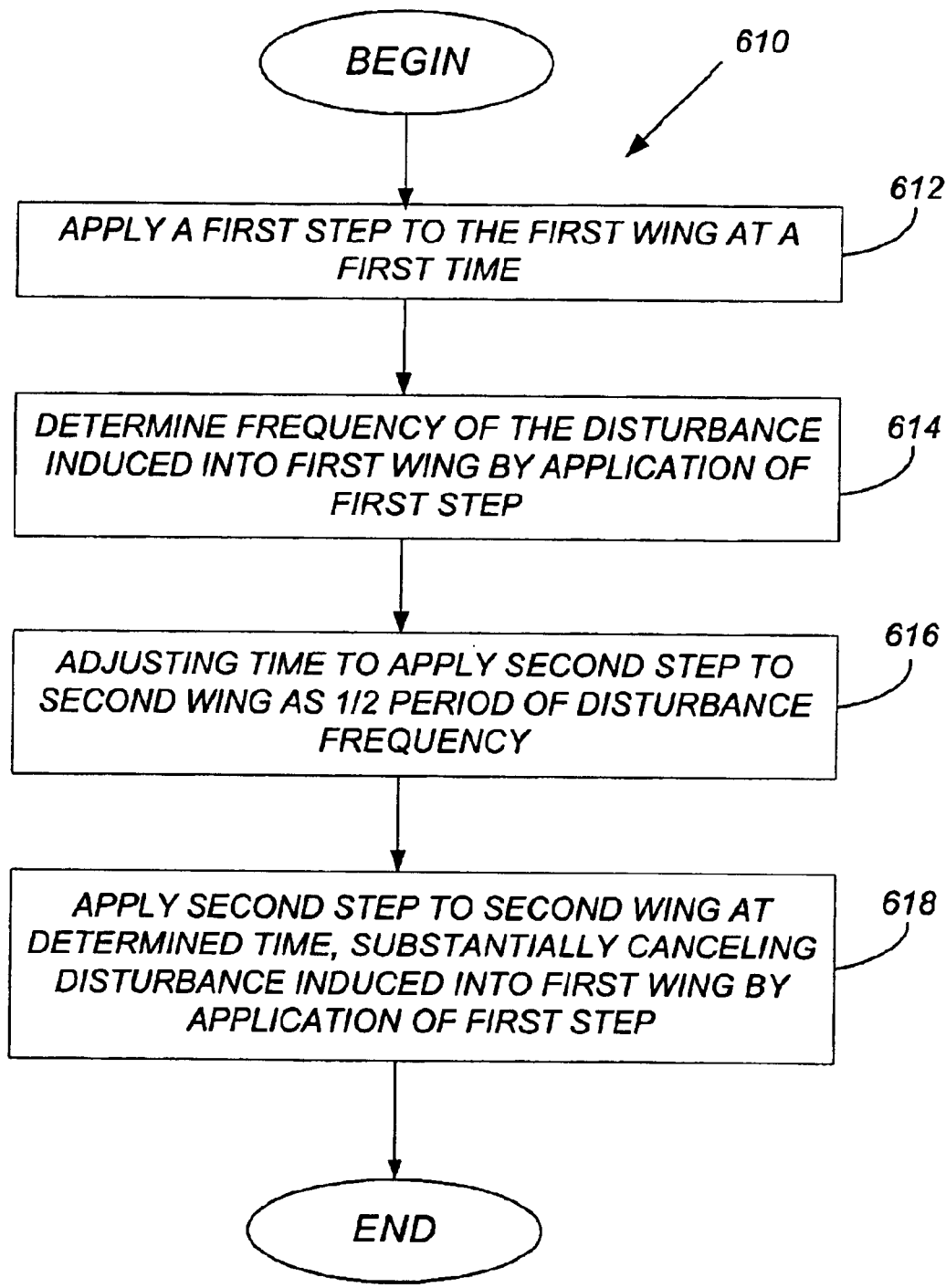
FIG. 5B is a flow chart illustrating exemplary method steps used to practice another embodiment of the present invention.

FIG. 5B illustrates details of another embodiment of the present invention method and system in accordance with the principles of the present invention for minimizing the disturbance induced by SWD 300 stepping. A first step is applied to a first appendage (e.g. solar wing 104) at a first time, as shown in block 612. The frequency of the disturbance induced into the first solar wing 104 then determined as shown in block 614. In block 616 the time to apply the second wing to the second appendage is adjusted according to the frequency determined in block 614, and in block 618, a second step is applied at the adjusted time, thus adapting to changes in the frequency cycle of the first solar wing.

FIG. 6A is a diagram showing the disturbance torque induced by the North solar array wing.

FIG. 6B is a diagram showing the disturbance torque induced by the South solar array wing.

FIG. 6C is a diagram showing the results of the cancellation method in accordance with the present invention, where the disturbance of one solar array wing cancels the disturbance of the other solar array wing.

FIGS. 7A and 7B are diagrams showing simulated reaction wheel assembly (RWA) torque oscillations resulting from applying step inputs to the solar wings 104. FIG. 7A depicts the RWA oscillations resulting when the disturbance-reducing techniques described above are not applied, whereas FIG. 7B depicts RWA oscillations resulting when the disturbance-reducing techniques are applied. Using these techniques, RWA torque oscillations are significantly reduced and the maximum torque is reduced by 30%.

Figure 8A:
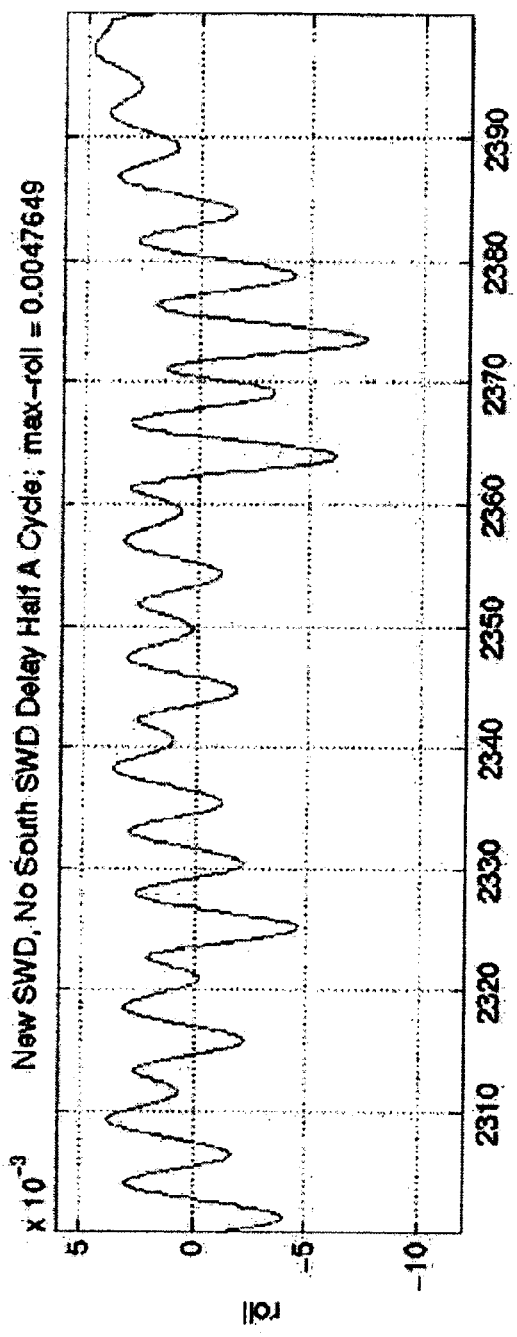
FIGS. 8A and 8B are diagrams showing the spacecraft pointing errors before and after applying the cancellation method in accordance with the present invention.
Figure 8B:
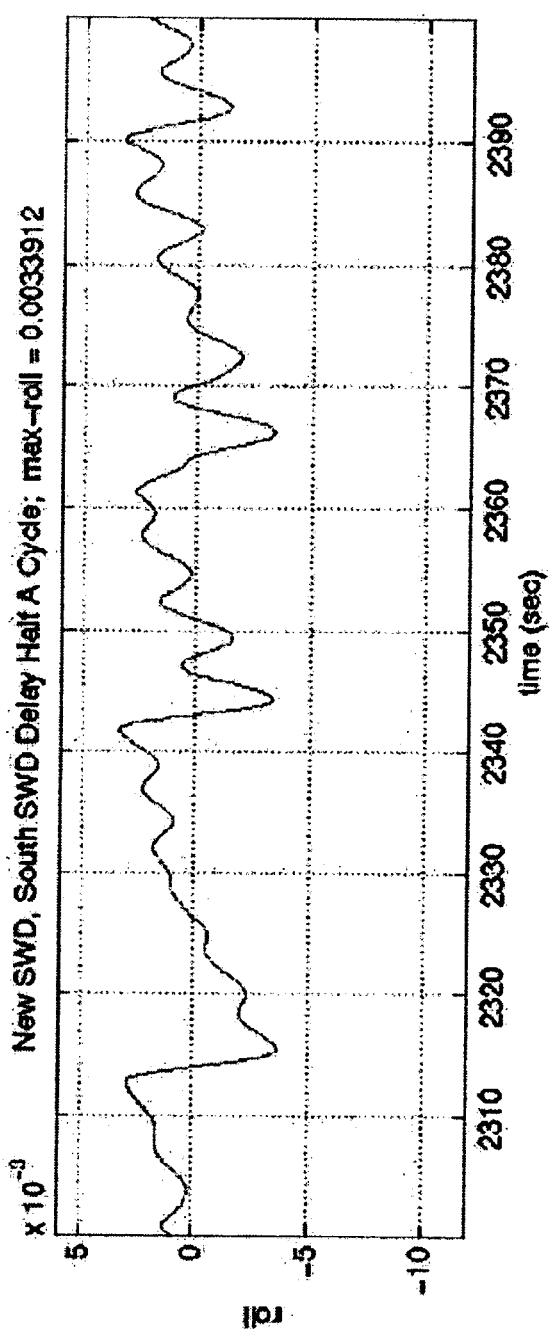

FIGS. 8A and 8B are diagrams showing simulated spacecraft 100 pointing errors resulting from applying step inputs to the solar wings 104. FIG. 8A shows the spacecraft 100 pointing errors resulting when the disturbance-reducing techniques described above are not applied, while FIG. 8B depicts spacecraft 100 pointing errors when the disturbance-reducing techniques are applied. Significantly, the FIG. 8B shows that the application of the disturbance-reducing techniques reduce spacecraft roll axis pointing errors by 29%.

Traditional techniques reduce the pointing error by increasing control loop bandwidth or control authority. These techniques usually require much higher control torque that will sometimes saturate control actuators such as RWA. After control actuators saturate, there will be no control of the spacecraft, the pointing error will actually become large. As shown in FIGS. 7A–8B, the present invention can reduce spacecraft pointing error with reduced RWA control torque, a result that can not be achieved by traditional techniques.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. For example, the present invention has been illustrated in application to the motion of solar arrays to track the sun in orbit. The present invention is particularly suitable to such applications because typically, solar wings with identical mass properties are deployed on opposing sides of the spacecraft and such that the center of mass of the solar wing structure is close to the center of mass of the spacecraft However, the foregoing invention is applicable to satellite appendages other than solar arrays (e.g. sensors and antennae), even appendages that do not have substantially identical mass properties and are not symmetric about the spacecraft, so long as the movement applied in one of the appendages can be used to cancel the disturbances caused by the movement of another one of the appendages by the timing and/or magnitude of such movement. Accordingly, it is intended that the scope of the invention be limited not by this detailed description, but rather by the claims appended hereto. The above specification, examples and data provide a complete description of the manufacture and use of the composition of the invention. Since many embodiments of the invention can be made without departing form the spirit and scope of the invention, the invention resides in the claims hereinafter appended.

What is claimed is:

1. A method of reducing induced disturbances in a spacecraft having a first solar array wing and a second solar array wing, each solar array wing controlled by a motor and having a torsional frequency with a frequency cycle, the method comprising the steps of:

applying a first step signal to said motor of said first solar array wing at a first time to induce a step movement of said first solar array wing;

applying a second step signal to said motor of said second solar array wing to induce a step movement of said second solar array wing at a second time following said first time by half of said frequency cycle of said first solar array wing, the disturbance generated by said second solar array wing substantially canceling the disturbance generated by said first solar array wing; and adjusting said second time relative to said first time to adapt to changes in said frequency cycle of said first solar array wing.

2. The method of claim 1, wherein said first solar array wing is a North solar array wing.

3. The method of claim 1, wherein said first solar array wing is a South solar array wing.

4. The method of claim 1, wherein said second solar array wing is a North solar array wing.

5. The method of claim 1, wherein said second solar array wing is a South solar array wing.

6. The method of claim 1, wherein said motor is a stepper motor.

7. A method of reducing stepping disturbances of a spacecraft having a North solar array wing and a South solar array wing, said each solar array wing controlled by a stepper motor and having a torsional frequency with a frequency period, the method comprising the steps of:

applying a first step signal to said stepper motor of said North solar array wing at a first time to induce a step movement of said North solar array wing; and applying a second step signal to said stepper motor of said South solar array wing to induce a step movement of said South solar array wing at a fixed second time following said first time by half of said frequency period of said North solar array wing, the disturbance generated by said South solar array wing cancels the disturbance generated by said North solar array wing; and adjusting said second time relative to said first time to adapt to changes in said frequency period of said North solar array wing.

8. In a spacecraft having a body with North and South solar array wings coupled thereto, said each solar array wing controlled by a stepper motor which is controlled by a solar wing driver (SWD) generating step signals for steadily rotating of said each solar array wing, said each solar array wing having a torsional frequency with a frequency period, a method of reducing induced stepping disturbances in the spacecraft, the method comprising the steps of:

applying a first step signal through said SWD to said stepper motor of said North solar array wing at a first time to induce a step movement of said North solar array wing; and applying a second step signal through said SWD to said stepper motor of said South solar array wing to induce a step movement of said South solar array wing at a fixed second time following said first time by half of said frequency period of said North solar array wing, the disturbance generated by said South solar array wing cancels the disturbance generated by said North solar array wing; and adjusting said second time relative to said first time to adapt to changes in said frequency period of said North solar array wing.

9. A spacecraft, comprising:

a body;

a first solar array wing coupled to said body that imparts a period disturbance on said body when the first solar array wing is stepped, the first solar array wing having a torsional frequency with a frequency cycle;

a second solar array wing coupled to said body that imparts a periodic disturbance on said body when the second solar array wing is stepped;

means for rotating said first solar array wing at a first time and rotating said second solar array wing at a second time following the first time by half of said frequency cycle of said first solar array wing, where the disturbance generated by said second solar array wing cancels the disturbance generated by said first solar array wing; and controller means for adjusting said second time relative to said first time to adapt to changes in said frequency cycle of said first solar array wing.

10. The spacecraft of claim 9, wherein said first solar array wing is a North solar array wing.

11. The spacecraft of claim 9, wherein said first solar array wing is a South solar array wing.

12. The spacecraft of claim 9, wherein said second solar array wing is a North solar array wing.

13. The spacecraft of claim 9, wherein said second solar array wing is a South solar array wing.

14. A spacecraft, comprising:
a body;
a North solar array wing coupled to said body that imparts a periodic disturbance on said body when the North solar array wing is stepped, the North solar array wing having a torsional frequency with a frequency period;
a South solar array wing coupled to said body that imparts a periodic disturbance on said body when the South solar array wing is stepped;
a control system for rotating said North solar array wing at a first time and rotating said South solar array wing at a fixed second time following the first time by half of said frequency period of said North solar array wing, where the disturbance generated by said South solar array wing cancels the disturbance generated by said North solar wing; and
means for adjusting said second time relative to said first time to adapt to changes in said frequency period of said North solar array wing.

15. A spacecraft, comprising:
a body,
a North solar array wing coupled to said body that imparts a periodic disturbance on said body when the North solar array wing is stepped, the North solar array wing having a torsional frequency with a frequency period;
a South solar array wing coupled to said body that imparts a periodic disturbance on said body when the South solar array wing is stepped;
a North solar wing driver coupled to a stepper motor which in turn is coupled to said North solar array wing for rotating said North solar array wing at a first time; and
a South solar wing driver coupled to a stepper motor which in turn is coupled to said South solar array wing for rotating said South solar array wing at a fixed second time following said first time by half of said frequency period of said North solar array wing, where the disturbance generated by said South solar array wing cancels the disturbance generated by said North solar array wing; and
means for adjusting said second time relative to said first time to adapt to changes in said frequency period of said North solar array wing.

16. A method of reducing disturbances resulting from stepping a first appendage and a second appendage, wherein the first appendage response to each a step is at least partially characterizable by a first natural frequency, and the second appendage response to each a step is at least partially characterizable by a first natural frequency, the method comprising the steps of:
applying a first step to the first appendage at a first time;
applying a second step to the second appendage at a second time; and
adjusting the second time relative to the first time to adapt to changes in the first natural frequency;
wherein the second time is selected to substantially cancel first appendage oscillations resulting from applying the first step to the first appendage.

17. The method of claim 16, wherein the second time is approximately equal to one half of a period of the first natural frequency.

18. The method of claim 16, wherein the first appendage and the second appendage have substantially the same mass properties and structural frequency properties.

19. A method of reducing induced disturbances in a spacecraft, comprising the steps of:
applying a first step to a first appendage of the spacecraft at a first time to induce a step movement of the first appendage;
determining a frequency of the disturbances induced by application of the first step;
adjusting a second time to apply a second step to a second appendage of the spacecraft according to the determined frequency of said induced disturbances; and
applying the second step to the second appendage to induce a step movement of the second appendage at the adjusted second time.

20. The method of claim 19, wherein the first appendage and second appendage are disposed substantially symmetrically about the spacecraft.

21. The method of claim 19, wherein the adjusted second time follows the first time by half of a frequency cycle of the induced disturbances.

22. The method of claim 21, wherein the first appendage and the second appendage are not symmetric and an amplitude of the second step is controlled to substantially cancel the induced disturbances.

* * * * *